US012802659B2

(12) United States Patent
Nagira et al.

(10) Patent No.: US 12,802,659 B2
(45) Date of Patent: Nov. 17, 2026

(54) DRIVE CIRCUIT, DISPLAY DEVICE, AND DISPLAY DEVICE HAVING TOUCH DETECTION FUNCTION

(71) Applicant: Sharp Display Technology Corporation, Kameyama City (JP)

(72) Inventors: Nami Nagira, Kameyama City (JP); Yuhichiroh Murakami, Kameyama City (JP); Shige Furuta, Kameyama City (JP); Yasushi Sasaki, Kameyama City (JP); Hiroyuki Adachi, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 19/276,553

(22) Filed: Jul. 22, 2025

(65) Prior Publication Data

US 2026/0031059 A1 Jan. 29, 2026

(30) Foreign Application Priority Data

Jul. 29, 2024 (JP) ................................. 2024-122356

(51) Int. Cl.
*G09G 3/36* (2006.01)
*G06F 3/041* (2006.01)

(52) U.S. Cl.
CPC ....... *G09G 3/3677* (2013.01); *G06F 3/04166* (2019.05); *G09G 2300/0426* (2013.01); *G09G 2300/0819* (2013.01); *G09G 2310/0289* (2013.01); *G09G 2354/00* (2013.01)

(58) Field of Classification Search
CPC ......... G09G 3/3677; G09G 2300/0426; G09G 2300/0819; G09G 2310/0289; G09G 2354/00; G06F 3/04166; G06F 3/0412; G06F 3/04184
See application file for complete search history.

(56) References Cited

U.S. PATENT DOCUMENTS

2019/0080658 A1* 3/2019 Yamamoto ........ G02F 1/136286
2019/0147822 A1* 5/2019 Takeuchi ............ G06F 3/04166 345/208
2019/0164509 A1* 5/2019 Yoshida ................... G09G 3/36
2023/0104048 A1* 4/2023 Kitagawa ............ G06F 3/04166 345/178

FOREIGN PATENT DOCUMENTS

JP 2019049652 A 3/2019

* cited by examiner

*Primary Examiner* — Jose R Soto Lopez
(74) *Attorney, Agent, or Firm* — ScienBiziP, P.C.

(57) ABSTRACT

A unit circuit of a gate drive circuit includes first and second nodes and first to fifth transistors. The first transistor outputs a drive signal from a terminal thereof in response to a clock signal. A set signal is input to the second transistor, which charges the first node. A reset signal is input to the third transistor, which discharges the first node. The fourth transistor is located between the first node and the second node and is in an off state during a touch detection period. The first node is connected to a gate electrode of the fifth transistor, and the fifth transistor charges the second node when a potential of the first node becomes high level or more. A signal that is a gate-on voltage during the touch detection period and is a gate-off voltage during a display period is input to the third transistor.

6 Claims, 17 Drawing Sheets

1a

DRIVE CIRCUIT, DISPLAY DEVICE, AND DISPLAY DEVICE HAVING TOUCH DETECTION FUNCTION

CROSS-REFERENCE TO RELATED APPLICATIONS

This application claims the benefit of priority to Japanese Patent Application Number 2024-122356 filed on Jul. 29, 2024. The entire contents of the above-identified application are hereby incorporated by reference.

BACKGROUND

Technical Field

The disclosure relates to a drive circuit, a display device, and a display device having a touch detection function.

A drive circuit described in JP 2019-49652 A includes multiple unit circuits. The drive circuit alternately switches a scanning period during which scanning lines are scanned and a non-scanning period during which scanning of the scanning lines is stopped within one vertical scanning period in accordance with a control signal. The unit circuit includes a first transistor, a second transistor, a third transistor, a fourth transistor, an internal wiring line, and a charging circuit. The first transistor applies a selection voltage to the scanning line. The second transistor charges the internal wiring line to a first potential. The third transistor includes a drain electrode connected to the internal wiring line and a source electrode connected to a terminal having a second potential lower than the first potential. A source electrode of the fourth transistor is connected to the internal wiring line, and a drain electrode of the fourth transistor is connected to the terminal having the second potential. With the internal wiring line of the unit circuit charged to the first potential, the scanning period is switched to the non-scanning period. The charging circuit recharges the internal wiring line to the first potential when the non-scanning period ends and before the scanning period starts.

SUMMARY

In the unit circuit of the drive circuit described in JP 2019-49652 A, the third transistor and the fourth transistor are located between the internal wiring line and the terminal having the second potential. Thus, during the non-scanning period, a current leaks from the internal wiring line via the third transistor and the fourth transistor. Therefore, the unit circuit described in JP 2019-49652 A requires a charging circuit for recharging the internal wiring line to the first potential before the scanning period starts. As a result, the drive circuit requires the charging circuit for each unit circuit, resulting in large unit circuits.

Thus, the disclosure has been made to solve the problem described above, and an object of the disclosure is to provide a drive circuit, a display device, and a display device having a touch detection function that enable downsizing of the unit circuit.

In order to solve the problem described above, a drive circuit according to a first aspect is a drive circuit that includes multiple unit circuits, each of the multiple unit circuits outputs a drive signal to at least one scanning signal line of a group of scanning signal lines. A drive period during which the drive signal is supplied to the group of scanning signal lines in response to input of a clock signal and a stop period during which supply of the drive signal to the group of scanning signal lines is stopped are provided within one cycle of a vertical synchronization signal. A unit circuit of the multiple unit circuits includes a first node, a first transistor configured to output the drive signal to the scanning signal line, the first node being connected to a gate electrode of the first transistor, the clock signal being applied to one of a source electrode and a drain electrode of the first transistor, and the other of the source electrode and the drain electrode of the first transistor being connected to the scanning signal line, a second transistor to which a set signal for the unit circuit is input, the set signal being input to a gate electrode of the second transistor, and one of a source electrode and a drain electrode of the second transistor being connected to the first node, a third transistor to which a reset signal for the unit circuit is input, the reset signal being input to a gate electrode of the third transistor, and one of a source electrode and a drain electrode of the third transistor being connected to the first node, a second node, a fourth transistor, the first node being connected to one of a source electrode and a drain electrode of the fourth transistor, and the second node being connected to the other of the source electrode and the drain electrode of the fourth transistor, and a fifth transistor, the first node being connected to a gate electrode of the fifth transistor, a gate-on voltage being applied to one of a source electrode and a drain electrode of the fifth transistor, and the second node being connected to the other of the source electrode and the drain electrode of the fifth transistor, and a stop period signal configured to be the gate-on voltage during the stop period and configured to be a gate-off voltage during the drive period is input to the other of the source electrode and the drain electrode of the third transistor.

A display device according to a second aspect includes the drive circuit according to the first aspect and a substrate provided with the group of scanning signal lines.

A display device having a touch detection function according to a third aspect includes the drive circuit according to the first aspect, and a touch panel provided with the group of scanning signal lines, being configured to display an image during the drive period and being configured to detect a touch by a pointer during the stop period.

According to the configurations described above, the potential of the first node can be maintained even during the stop period, eliminating the need for a charging circuit to recharge the first node before the drive period starts, thereby downsizing the unit circuit.

BRIEF DESCRIPTION OF DRAWINGS

The disclosure will be described with reference to the accompanying drawings, wherein like numbers reference like elements.

DESCRIPTION OF EMBODIMENTS

Figure 1:
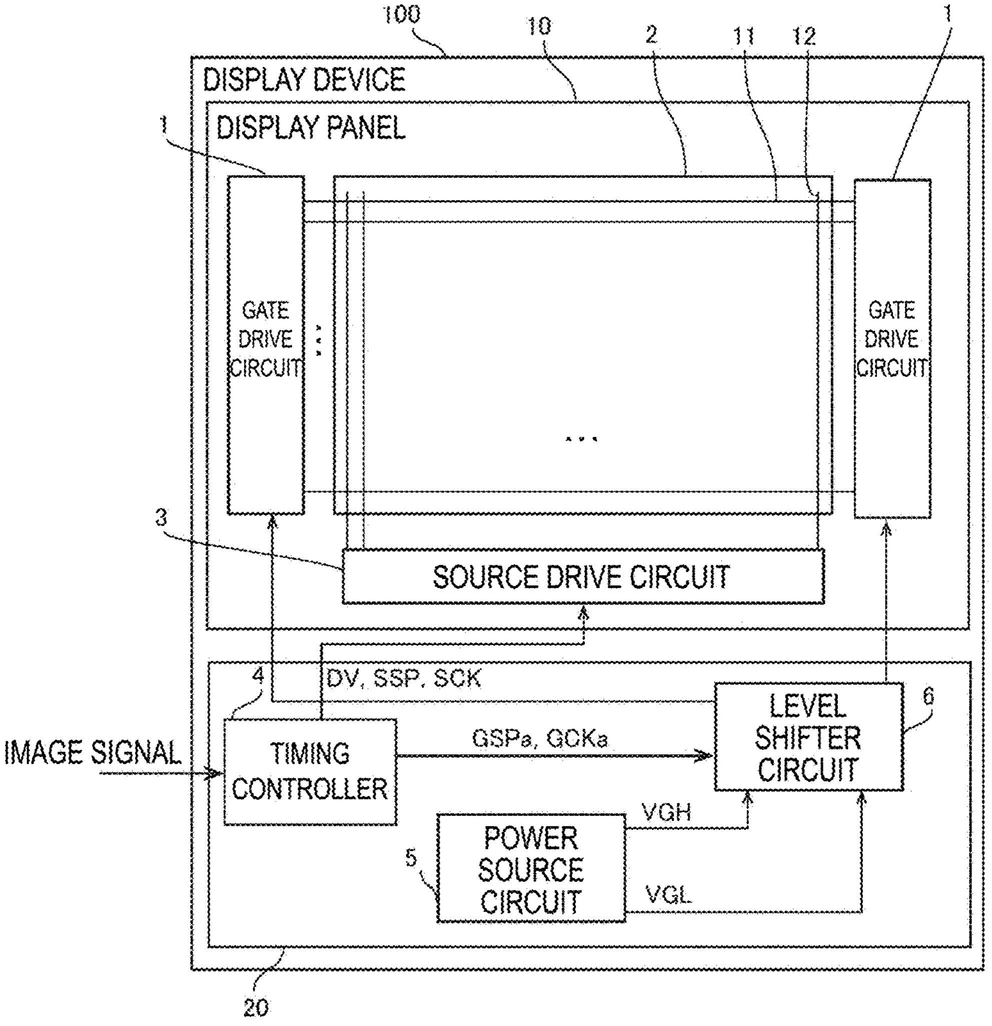
FIG. 1 is a block diagram illustrating a configuration of a display device 100 according to a first embodiment.

Embodiments of the disclosure will be described below with reference to the drawings. Note that the disclosure is not limited to the following embodiments, and appropriate design changes can be made within a scope that satisfies the configuration of the disclosure. In the description below, the same reference signs are used in common among the different drawings for portions having the same or similar functions, and repeated description thereof will be omitted. Further, the configurations described in the embodiments and the modified examples may be combined or modified as appropriate within a range that does not depart from the gist of the disclosure. For ease of explanation, in the drawings referenced below, the configuration is simplified or schematically illustrated, or some components are omitted.

First Embodiment

Overall Configuration of Display Device

FIG. 1 is a block diagram illustrating a configuration of a display device 100 according to a first embodiment. The display device 100 according to the first embodiment is configured as a display device having a touch detection function (or a display device with a touch panel). As illustrated in FIG. 1, the display device 100 includes a display panel 10 (touch panel) and a control board 20. The display panel 10 and the control board 20 are connected via a flexible printed circuit board or the like. The display panel 10 includes two gate drive circuits 1, a display portion 2 that is a region in which an image is displayed, and a source drive circuit 3. The control board 20 is provided with a timing controller 4, a power source circuit 5, and a level shifter circuit 6.

The timing controller 4 receives timing signals (such as a horizontal synchronization signal, a vertical synchronization signal, and a data enable signal) and an image signal, and generates a digital video signal DV, a source start pulse signal SSP, a source clock signal SCK, a gate start pulse signal GSPa, and a gate clock signal GCKa based on the received signals, as illustrated in FIG. 1. The timing controller 4 transmits the digital video signal DV, the source start pulse signal SSP, and the source clock signal SCK to the source drive circuit 3. The timing controller 4 also transmits the gate start pulse signal GSPa and the gate clock signal GCKa to the level shifter circuit 6.

The power source circuit 5 generates a gate-on voltage VGH and a gate-off voltage VGL based on power input from an external power supply or a battery (not illustrated). The gate-on voltage VGH and the gate-off voltage VGL are DC voltages having constant levels (voltage values). The power source circuit 5 inputs the generated gate-on voltage VGH and gate-off voltage VGL to the level shifter circuit 6.

Figure 2:
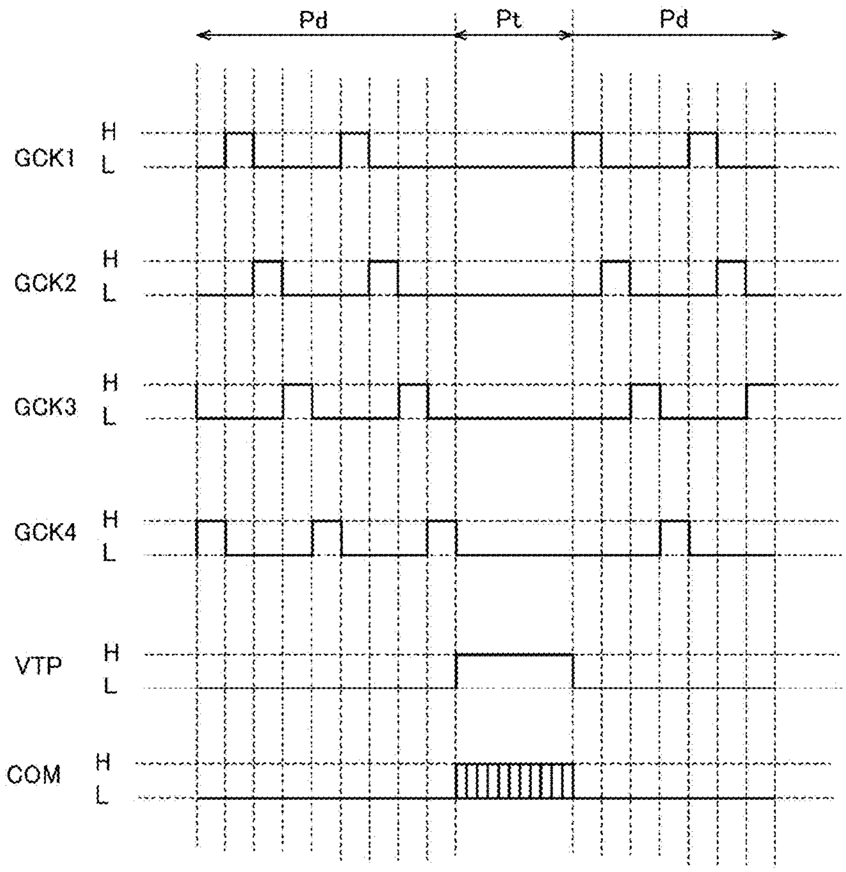
FIG. 2 is a timing chart for describing an example of signals output from a level shifter circuit 6.

FIG. 2 is a timing chart for describing an example of signals output from the level shifter circuit 6. Based on the gate start pulse signal GSPa, the gate clock signal GCKa, the gate-on voltage VGH, and the gate-off voltage VGL, the level shifter circuit 6 generates clock signals GCK1 to GCK4 and a VTP signal that has the same potential as the gate-on voltage VGH (hereinafter referred to as "high level") during a touch detection period Pt, which is a period for detecting a touch by a pointer, and has the same potential as the gate-off voltage VGL (hereinafter referred to as "low level") during periods other than the touch detection period, including a display period Pd, as illustrated in FIG. 2. That is, the VTP signal is a stop period signal that has a high level (gate-on voltage VGH) during a period in which scanning of multiple gate lines 11 is stopped. The level shifter circuit 6 inputs the generated signals to the gate drive circuits 1. The clock signal GCK2 is a signal having a phase shifted by 90 degrees from the clock signal GCK1. The clock signal GCK3 is a signal having a phase shifted by 180 degrees from the clock signal GCK1. The clock signal GCK4 is a signal having a phase shifted by 270 degrees from the clock signal GCK1. The timing controller 4 performs a process of repeating the display period Pd and the touch detection period Pt multiple times in a time division manner within one cycle of a vertical synchronization signal.

Figure 3:
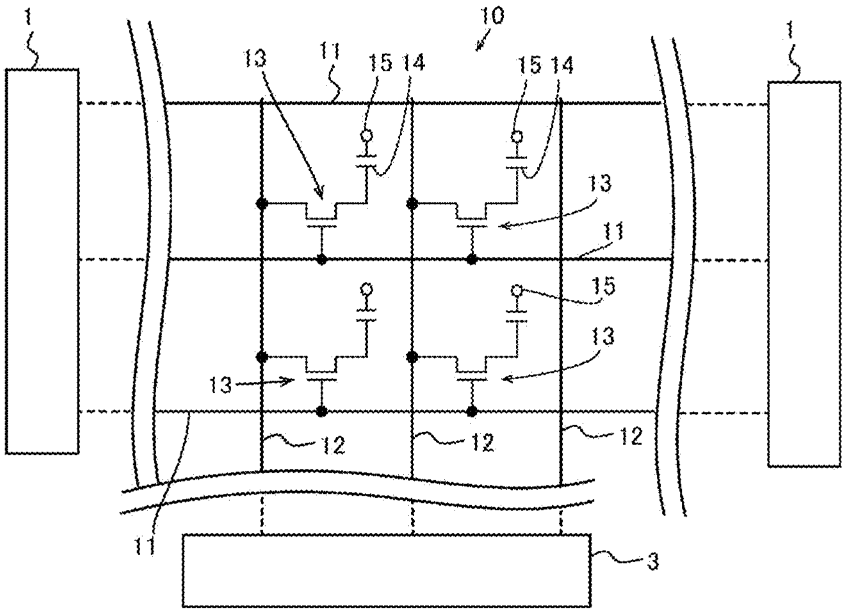
FIG. 3 is a circuit diagram illustrating an internal configuration of a display panel 10.
Figure 4:
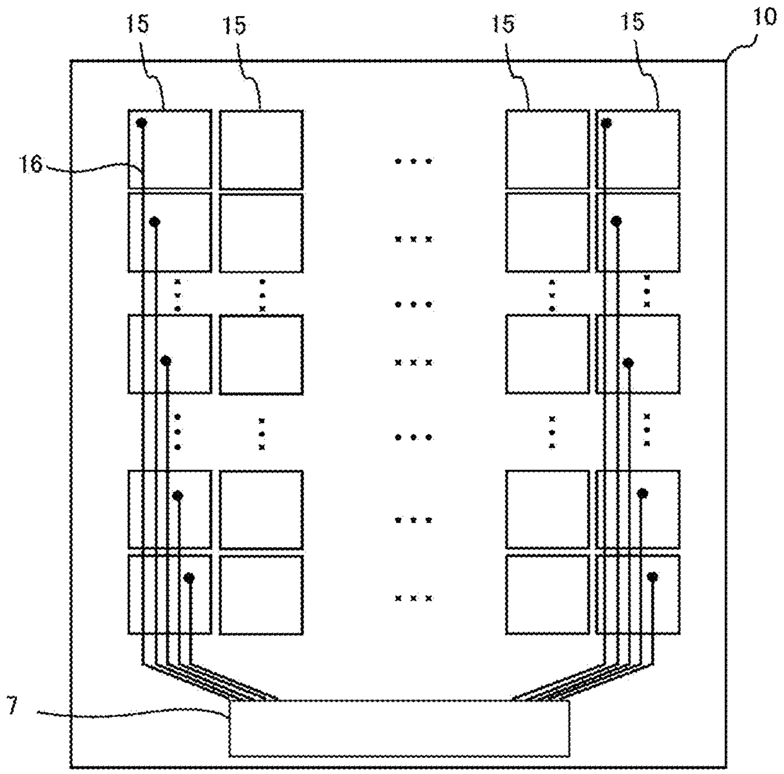
FIG. 4 is a schematic view illustrating an arrangement of common electrodes.
Figure 5:
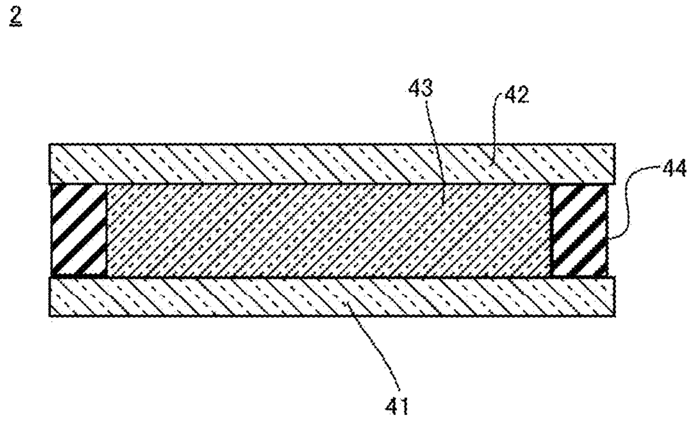
FIG. 5 is a cross-sectional view illustrating a configuration of a display portion 2.

FIG. 3 is a circuit diagram illustrating an internal configuration of the display panel 10. FIG. 4 is a schematic view illustrating an arrangement of common electrodes. FIG. 5 is a cross-sectional view illustrating a configuration of the display portion 2. As illustrated in FIG. 3, one of the two gate drive circuits 1 is located on one side of the display portion 2, and the other of the two gate drive circuits 1 is located on the other side of the display portion 2. The gate drive circuit 1 is a gate driver on array (Gate On Array (GOA)) formed on an active matrix substrate 41 (see FIG. 5) of the display panel 10. Since the two gate drive circuits 1 have the same configuration, the following description will only describe the configuration of one of the two gate drive circuits 1 and the description of the configuration of the other will be omitted.

The display panel 10 is provided with multiple gate lines 11 constituting a group of scanning signal lines each connected to the gate drive circuits 1 and multiple source lines 12 constituting a group of source signal lines connected to the source drive circuit 3. The multiple gate lines 11 and the multiple source lines 12 are arranged to intersect with each other, and pixels are located in regions divided by the multiple gate lines 11 and the multiple source lines 12, respectively. The multiple pixels are arrayed in a matrix in the display panel 10.

As illustrated in FIG. 3, the pixel is provided with a pixel transistor 13 and a pixel electrode 14. A gate electrode of the pixel transistor 13 is connected to the gate line 11. A source electrode of the pixel transistor 13 is connected to the source line 12. A drain electrode of the pixel transistor 13 is connected to the pixel electrode 14.

When the pixel transistor 13 is turned on by a drive signal (gate signal) supplied via the gate line 11, a source signal supplied via the source line 12 is written to (charged into) the pixel electrode 14. Thus, an electrical field is formed between the pixel electrode 14 and a common electrode 15 located to face the pixel electrode 14.

As illustrated in FIG. 4, the multiple common electrodes 15 are arranged, for example, in a matrix. A touch detection control circuit 7 is connected to the multiple common electrodes 15 through corresponding wiring lines 16. Electrostatic capacitance of the common electrodes 15 changes due to capacitive coupling between the common electrodes and the pointer. As illustrated in FIG. 2, the touch detection control circuit 7 supplies a touch drive signal (pulse signal) COM to the multiple common electrodes 15 during the touch detection period Pt. A waveform of the pulse signal changes depending on the magnitude of the electrostatic capacitance of the common electrodes 15. The touch detection control circuit 7 detects a touch by the pointer (touched position) based on the waveform of the pulse signal from the common electrodes 15. That is, the common electrodes 15 also serve as touch detection electrodes. The display panel 10 is a self-capacitance type touch panel. Note that, not limited to this example, the display panel 10 may be configured as a mutual-capacitive touch panel. Note that FIG. 4 illustrates an example in which the touch detection control circuit 7 is located on the display panel 10, but the touch detection control circuit 7 may be located on the control board 20.

As illustrated in FIG. 5, the display portion 2 includes the active matrix substrate 41, a counter substrate 42 located facing the active matrix substrate 41, a liquid crystal layer 43 located between the active matrix substrate 41 and the counter substrate 42, and a sealing member 44. The liquid crystal layer 43 is driven by the electrical field generated between the pixel electrode 14 and the common electrode 15 to display an image on the display panel 10. The sealing member 44 seals the liquid crystal layer 43.

Configuration of Gate Drive Circuit 1

Figure 6:
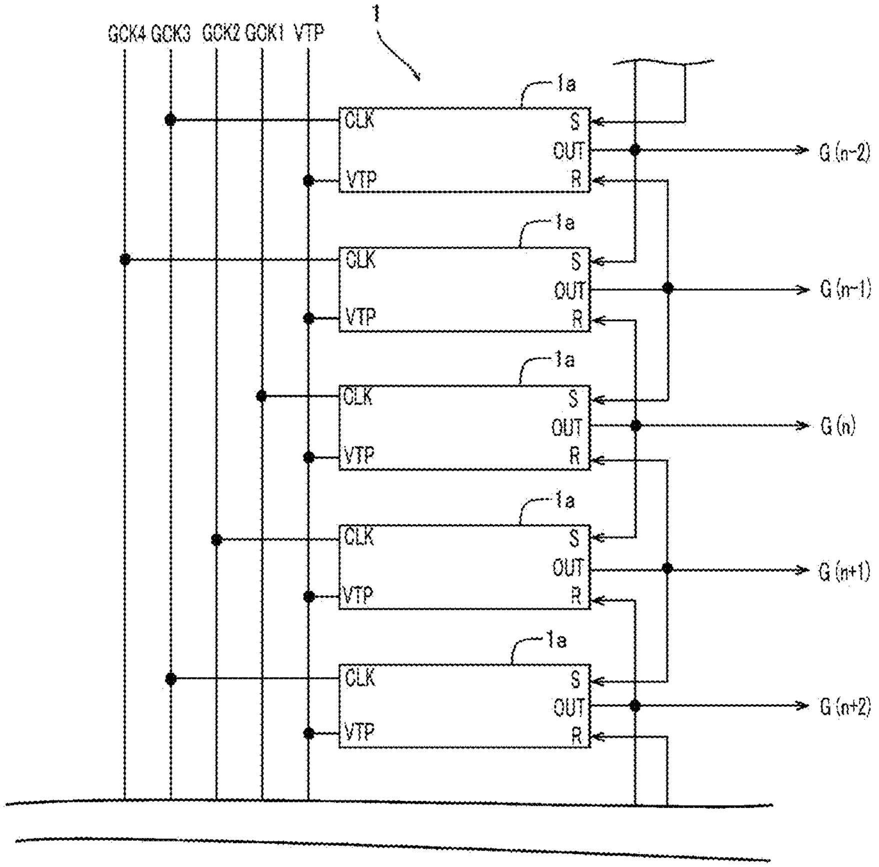
FIG. 6 is a diagram illustrating a configuration of a gate drive circuit 1.
Figure 7:
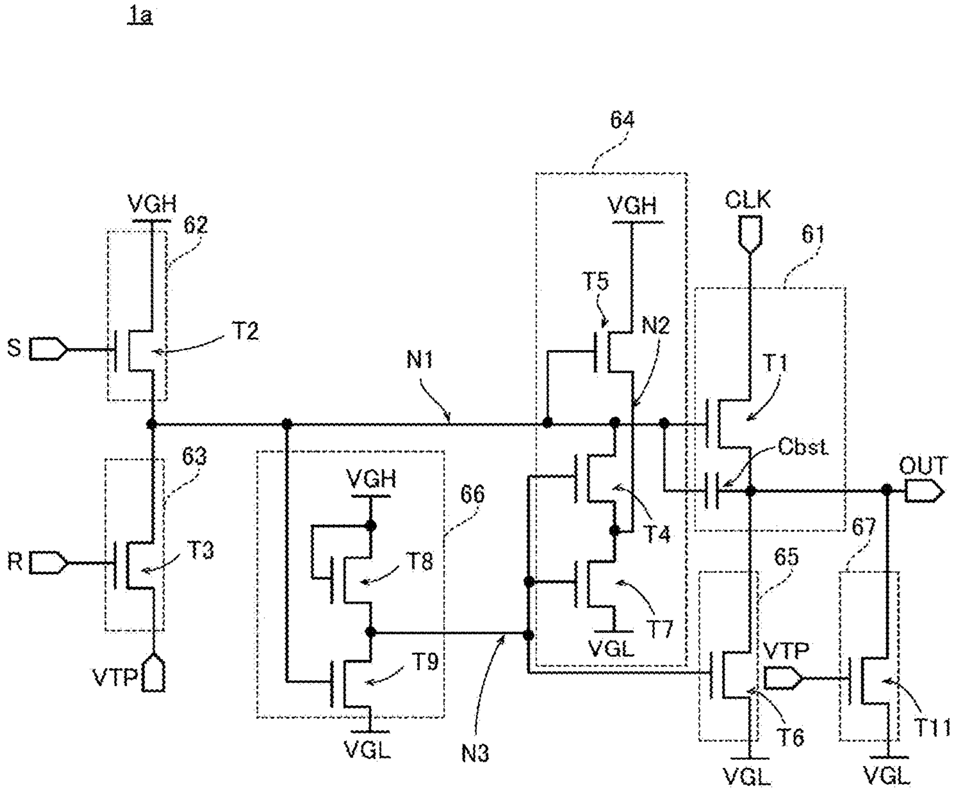
FIG. 7 is a circuit diagram illustrating a configuration of a unit circuit 1*a*.

FIG. 6 is a diagram illustrating a configuration of the gate drive circuit 1. FIG. 7 is a circuit diagram illustrating a configuration of a unit circuit 1*a*.

As illustrated in FIG. 6, the gate drive circuit 1 includes a shift register circuit that has multiple stages and sequentially supplies the drive signals to the gate lines 11 (G) in response to the input of the clock signals GCK1 to GCK4. The gate drive circuit 1 includes multiple unit circuits 1*a*, each of which constitutes one of the multiple stages and outputs the drive signal to the gate line 11 connected to the unit circuit 1*a*. The number of unit circuits 1*a* is the same as the number of gate lines 11. FIG. 6 illustrates some (five) of the multiple unit circuits 1*a*.

The unit circuit 1*a* receives one of the clock signals GCK1 to GCK4, and the VTP signal from the level shifter circuit 6. Although not illustrated in FIG. 6, the gate-on voltage VGH and the gate-off voltage VGL are input to the unit circuit 1*a*. The drive signal output from a terminal OUT of the unit circuit 1*a* in the previous stage (one previous stage in the example in FIG. 6) is input to a terminal S of the unit circuit 1*a* as a set signal. The drive signal output from a terminal OUT of the unit circuit 1*a* in the subsequent stage (one subsequent stage in the example in FIG. 6) is input to a terminal R of the unit circuit 1*a* as a reset signal. Thus, when the gate start pulse signal as the set signal is input from the level shifter circuit 6 to the unit circuit 1*a* in the first stage, the drive signals are output to the gate lines 11 in sequence up to the unit circuit 1*a* in the final stage.

As illustrated in FIG. 7, the unit circuit 1*a* includes transistors T1 to T9 and T11, a capacitor Cbst, and nodes N1 to N3. Further, the unit circuit 1*a* includes circuits 61 to 67. The circuit 61 is a circuit for outputting the drive signal from the terminal OUT. The circuit 61 includes the transistor T1 and the capacitor Cbst. The circuit 62 is a circuit for charging the node N1. The circuit 62 includes the transistor T2. The circuit 63 is a circuit for discharging the node N1. The circuit 63 includes the transistor T3. The circuit 64 is an active detection circuit for detecting that a potential of the node N1 is at the high level (active state). The circuit 64 includes the transistors T4, T5, and T7, and the node N2. The circuit 65 is a circuit for lowering a potential of the terminal OUT. The circuit 65 includes the transistor T6. The circuit 66 is a circuit for lowering a potential of the node N3 to turn off the transistors T4, T6, and T7 when the potential of the node N1 is at the high level. The circuit 66 includes the transistors T8 and T9, and the node N3. The node N1 connects the transistors T1 to T3 and the capacitor Cbst. Note that "high level" means a voltage (potential) that is the same as the gate-on voltage VGH and is indicated by "H" in the diagram. "Low level" means a voltage (potential) that is the same as the gate-off voltage VGL and is indicated as "L" in the diagram. In addition, a potential that exceeds the high level is indicated as "HH" in the diagram. The term "connected" refers not only to cases where circuit elements are physically connected, but also to cases where circuit elements are electrically connected via a wiring line, a resistor, a transistor in an on state, or the like.

The transistor T1 is a transistor for outputting the drive signal to the gate line 11 connected to the unit circuit 1*a*. The transistor T1 outputs the drive signal to the gate line 11 in response to one of the clock signals GCK1 to GCK4 input to the terminal CLK. The capacitor Cbst is a capacitor for turning on the transistor T1 by a potential increased by being charged.

A gate electrode of the transistor T1 is connected to the node N1. A source electrode of the transistor T1 is connected to the terminal CLK. A drain electrode of the transistor T1 is connected to the terminal OUT from which the drive signal is output. One end of the capacitor Cbst is connected to the gate electrode of the transistor T1, and the other end of the capacitor Cbst is connected to the drain electrode of the transistor T1.

The transistor T2 is a transistor for increasing (charging) the potential of the node N1 in response to input of the set signal. A gate electrode of the transistor T2 is connected to the terminal S to which the set signal is input. The gate-on voltage VGH is applied to a source electrode of the transistor T2. A drain electrode of the transistor T2 is connected to the node N1.

The transistor T3 is a transistor for decreasing (discharging) the potential of the node N1 in response to input of the reset signal. A gate electrode of the transistor T3 is connected to the terminal R to which the reset signal is input. A source electrode of the transistor T3 is connected to the terminal VTP to which the VTP signal is input. A drain electrode of the transistor T3 is connected to the node N1.

The transistor T4 is a transistor for maintaining the potential of the node N1 at the high level. A drain electrode of the transistor T4 is connected to the node N1. A source electrode of the transistor T4 is connected to the node N2. A gate electrode of the transistor T4 is connected to the node N3.

The transistor T5 is a transistor for applying the gate-on voltage VGH to the source electrode of the transistor T4. A drain electrode of the transistor T5 is connected to the node N2. The gate-on voltage VGH is applied to a source electrode of the transistor T5. A gate electrode of the transistor T5 is connected to the node N1.

The transistor T6 is a transistor for lowering the potential of the terminal OUT. A drain electrode of the transistor T6 is connected to the terminal OUT. The gate-off voltage VGL is applied to a source electrode of the transistor T6. A gate electrode of the transistor T6 is connected to the node N3.

The transistor T7 is a transistor for lowering a potential of the node N2. A drain electrode of the transistor T7 is connected to the node N2. The gate-off voltage VGL is applied to a source electrode of the transistor T7. A gate electrode of the transistor T7 is connected to the node N3.

The transistor T8 is a transistor for charging the node N3. The gate-on voltage VGH is applied to a source electrode and a gate electrode of the transistor T8. A drain electrode of the transistor T8 is connected to the node N3.

The transistor T9 is a transistor for lowering the potential of the node N3. A drain electrode of the transistor T9 is connected to the node N3. The gate-off voltage VGL is applied to a source electrode of the transistor T9. A gate electrode of the transistor T9 is connected to the node N1.

The transistor T11 is a transistor for lowering the potential of the terminal OUT during the touch detection period Pt. A drain electrode of the transistor T11 is connected to the terminal OUT. The gate-off voltage VGL is applied to a source electrode of the transistor T11. The VTP signal is input to a gate electrode of the transistor T11.

A semiconductor layer of each of the transistors T1 to T9 and T11 includes an oxide semiconductor. For the oxide semiconductor, an In—Ga—Zn—O-based oxide semiconductor having crystallinity can be used. According to this configuration, power consumption can be reduced, driving speed can be increased, and high definition can be achieved as compared with the case in which each transistor is made of amorphous silicon.

Operation of Unit Circuit 1*a* According to First Embodiment

Figure 8:
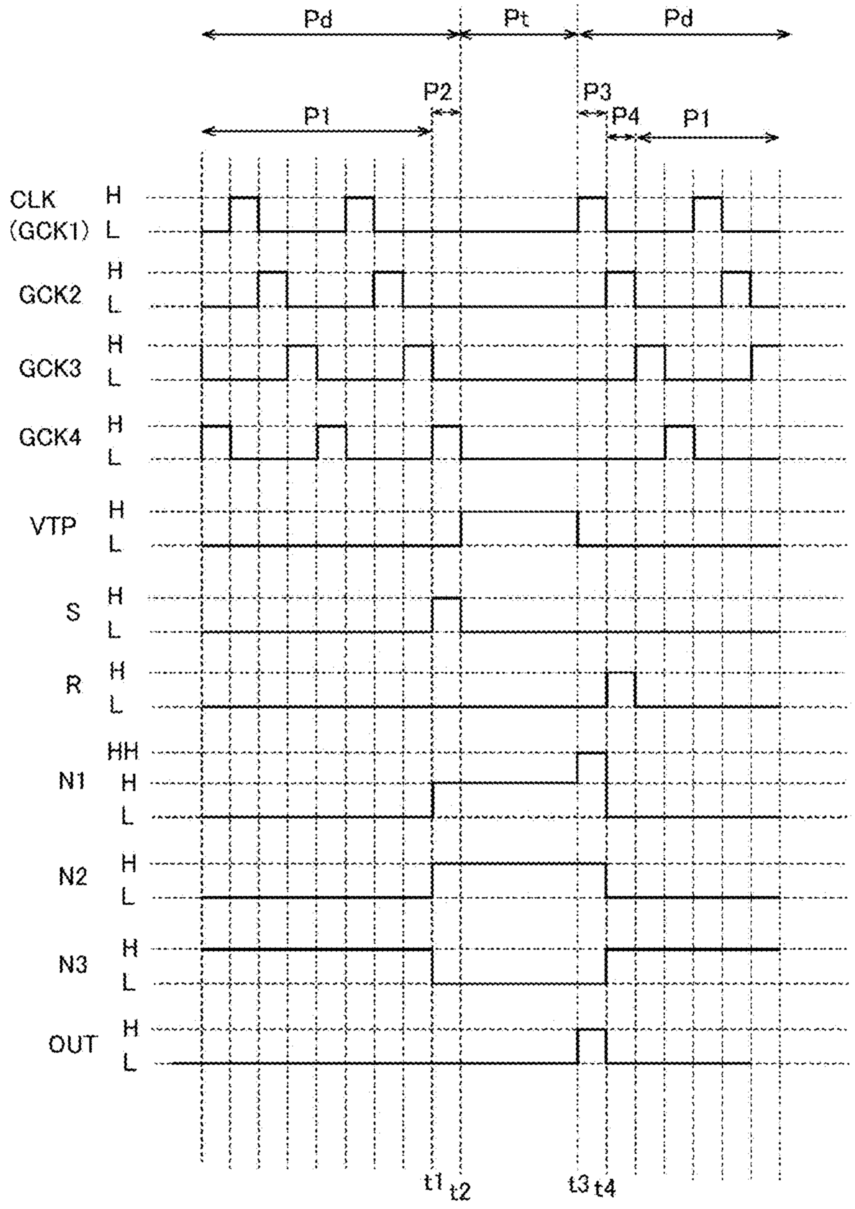
FIG. 8 is a timing chart for describing relationships between terminals of the unit circuit 1*a* according to the first embodiment and respective potentials.

FIG. 8 is a timing chart for describing relationships between the terminals of the unit circuit 1*a* according to the first embodiment and respective potentials. Note that FIG. 8 illustrates a state of the unit circuit 1*a* that is in the active state when the touch detection period Pt starts.

One of the clock signals GCK1 to GCK4 is input to the terminal CLK of the unit circuit 1*a*. In the example illustrated in FIG. 8, the clock signal GCK1 is input to the terminal CLK.

During a period P1, the unit circuits 1*a* up to the previous stage are driven. At a time t1 when a period P2 starts, when the set signal is input to the terminal S (when the voltage becomes "H"), the nodes N1 and N2 are charged from "L" to "H" and the node N3 is discharged from "H" to "L". That is, the unit circuit 1*a* is in the active state. Then, at a time t2 when the display period Pd (period P2) ends and the touch detection period Pt starts, the VTP signal to the unit circuit 1*a* becomes "H" and supply of the clock signals GCK1 to GCK4 to the unit circuit 1*a* is stopped, thereby stopping scanning by the gate drive circuit 1. During the touch detection period Pt, potentials of the drain electrode and the source electrode of the transistor T3 are both "H". Thus, a current (leakage current) flowing between the drain electrode and the source electrode of the transistor T3 can be reduced, thereby preventing a decrease in the potential of the node N1. Further, during the touch detection period Pt, a potential difference between the drain electrode and the source electrode of the transistor T4 is approximately 0, thereby preventing a decrease in the potential of the node N1. As a result, the potential of the node N1 can be maintained even during the touch detection period Pt, eliminating the need for a charging circuit to recharge the node N1 before the display period Pd starts, thereby downsizing the unit circuit 1*a*. Note that in the unit circuits 1*a* other than the unit circuit 1*a* in the active state illustrated in FIG. 8, the node N1 becomes "L" during the touch detection period Pt, so that the transistor T4 is in the on state.

At a time t3 when the touch detection period Pt ends and the display period Pd (period P3) starts, the clock signal GCK1 is input to the terminal CLK. As a result, the potential of the node N1 rises from "H" to "HH". Then, the potential of the terminal OUT becomes "H", the gate signal is output, the set signal is input to the unit circuit 1*a* in the next stage, and the reset signal is input to the unit circuit 1*a* in the previous stage. At a time t4 when the period P3 ends and a period P4 starts, when the reset signal is input to the terminal R (when the voltage becomes "H"), the node N1 is discharged from "HH" to "L", the node N2 is discharged from "H" to "L", and the node N3 is charged from "L" to "H".

Second Embodiment

Next, a configuration of a display device 200 according to a second embodiment will be described with reference to FIGS. 9 to 12. In the second embodiment, a signal INI is further input to a unit circuit 201*a*. Note that the same configurations as those of the first embodiment will be denoted by the same reference signs as those of the first embodiment, and descriptions thereof will be omitted.

Figure 9:
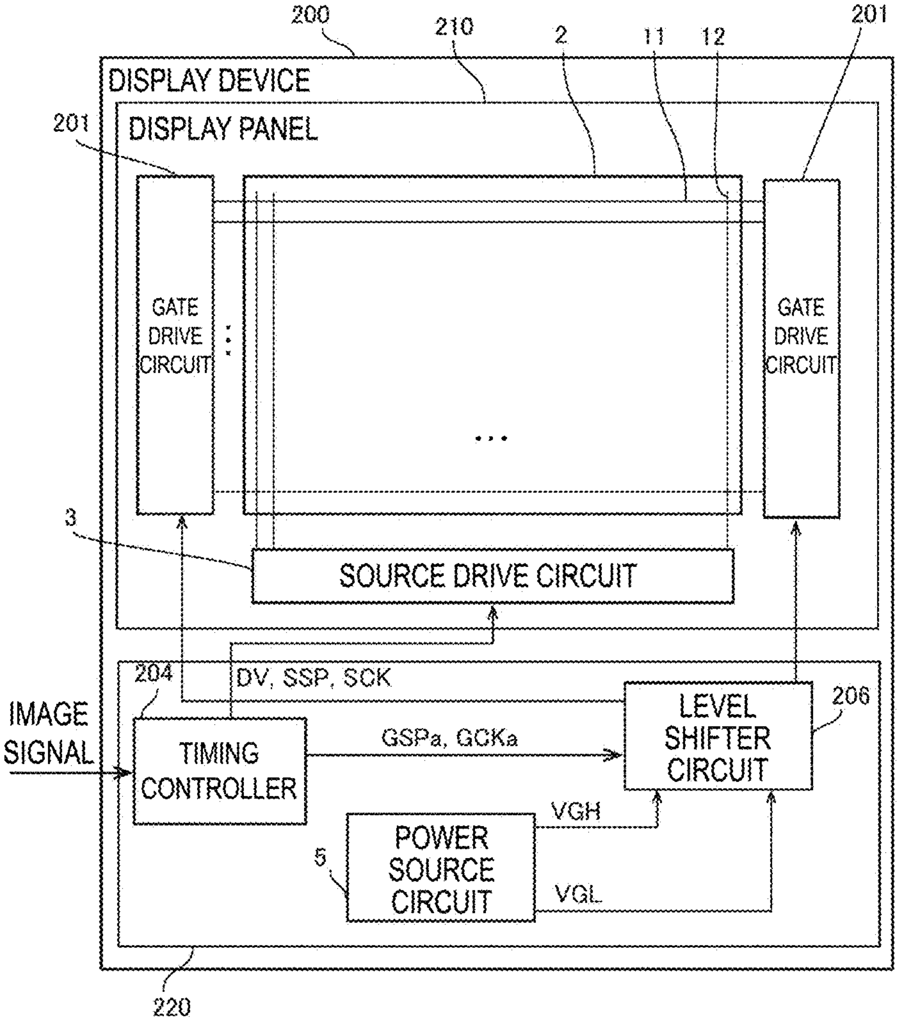
FIG. 9 is a block diagram of a display device 200 according to a second embodiment.
Figure 10:
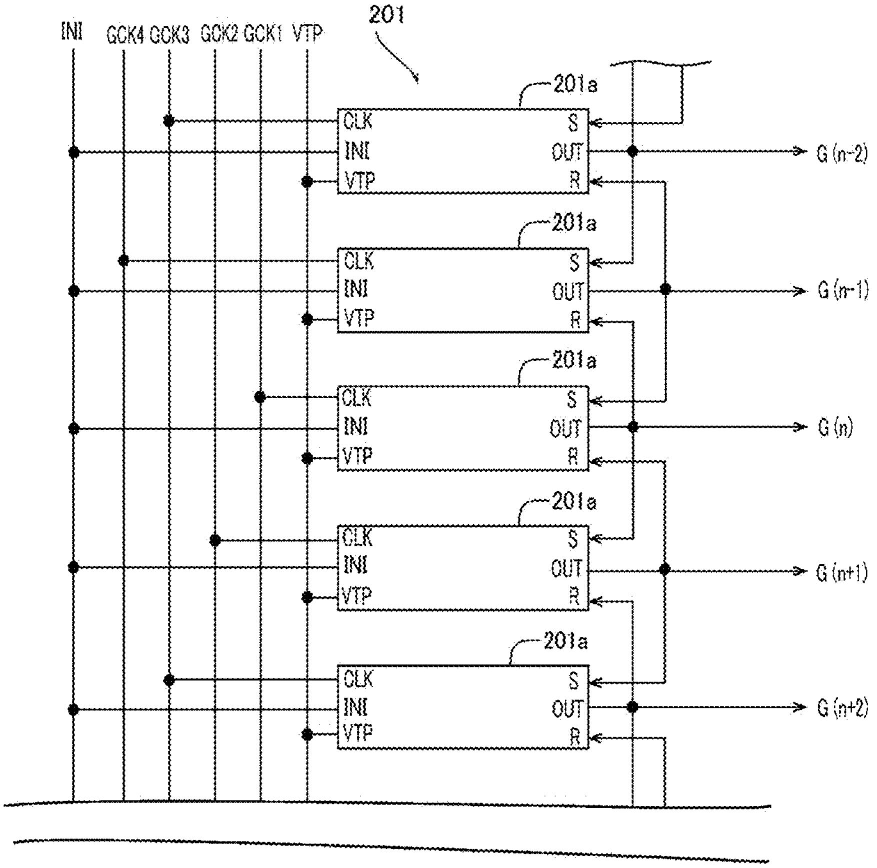
FIG. 10 is a diagram for describing a configuration of a gate drive circuit 201 according to the second embodiment.
Figure 11:
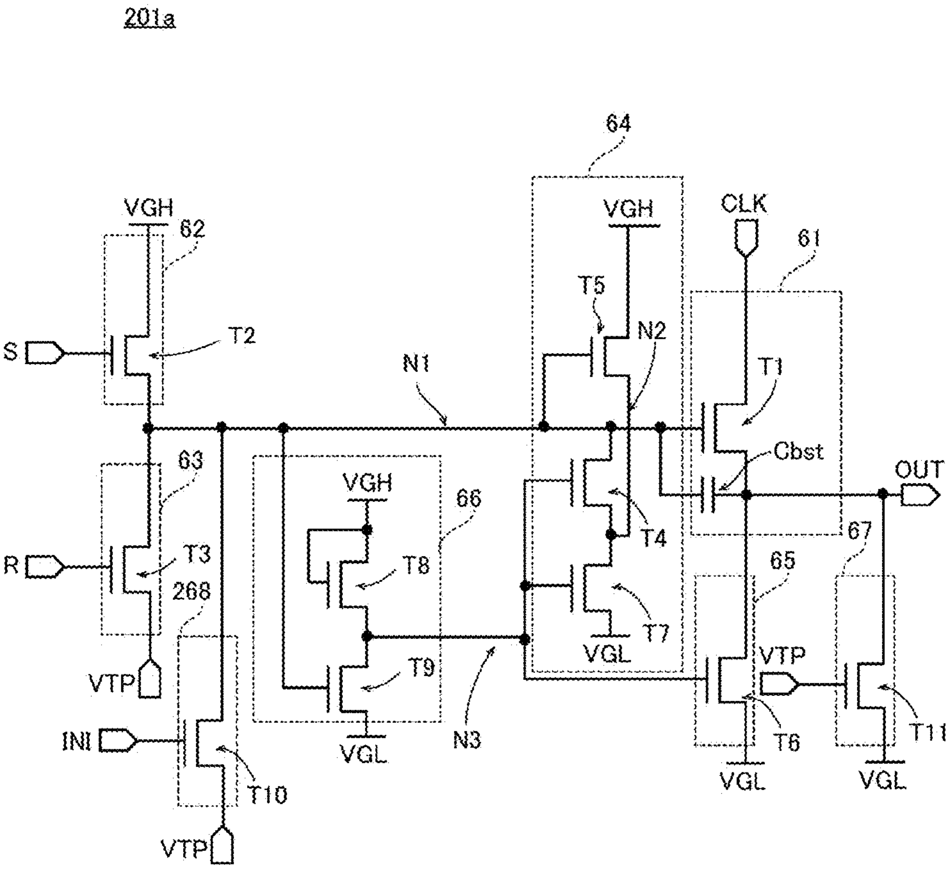
FIG. 11 is a circuit diagram for describing a configuration of a unit circuit 201*a* according to the second embodiment.
Figure 12:
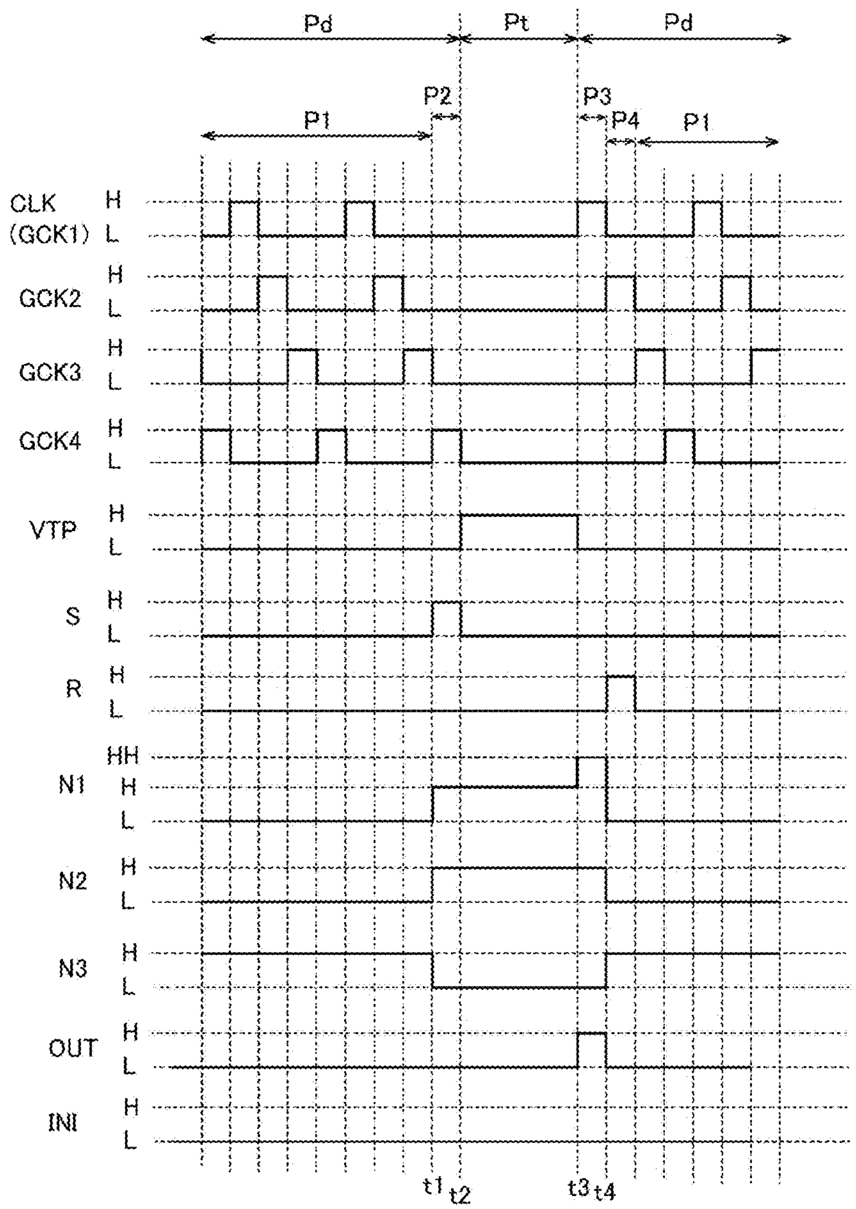
FIG. 12 is a timing chart for describing signals input to corresponding terminals of the unit circuit 201*a* according to the second embodiment.

FIG. 9 is a block diagram of the display device 200 according to the second embodiment. FIG. 10 is a diagram for describing a configuration of a gate drive circuit 201 according to the second embodiment. FIG. 11 is a circuit diagram for describing a configuration of the unit circuit 201*a* according to the second embodiment. FIG. 12 is a timing chart for describing signals input to corresponding terminals of the unit circuit 201*a* according to the second embodiment.

As illustrated in FIG. 9, the display device 200 includes a display panel 210 provided with gate drive circuits 201, and a control board 220 provided with a timing controller 204 and a level shifter circuit 206. The timing controller 204 detects commands to put the power on the display device 200 and to cut the power off the display device 200. When the timing controller 204 detects the command to put the power on the display device 200 or to cut the power off the display device 200, the timing controller 204 transmits a control signal to the level shifter circuit 206 to output an initialization signal INI. The level shifter circuit 206 outputs the initialization signal INI in response to the control signal from the timing controller 204 (the level shifter circuit 206 switches a potential from a low level to a high level). That is, the initialization signal INI is a signal that is a gate-on voltage VGH immediately after a start of input of a power supply voltage to the gate drive circuit 201, immediately before a stop of input of the power supply voltage to the gate drive circuit 201, or in synchronization with a vertical synchronization signal (for each cycle of the vertical synchronization signal) and is a gate-off voltage VGL during a display period Pd and a touch detection period Pt (see FIG. 12).

As illustrated in FIG. 10, the initialization signal INI is input to terminals INI of the unit circuits 201*a* of the gate drive circuit 201.

As illustrated in FIG. 11, the unit circuit 201*a* includes an initialization circuit 268. The initialization circuit 268 includes a transistor T10. The terminal INI to which the initialization signal INI is input is connected to a gate electrode of the transistor T10. A node N1 is connected to a drain electrode of the transistor T10. A VTP signal is input to a source electrode of the transistor T10.

As illustrated in FIG. 12, the initialization signal INI input to the unit circuit 201*a* is "L" during the display period Pd and the touch detection period Pt. Here, during the touch detection period Pt, the drain electrode of the transistor T10 is "H", which is a potential of the node N1, and the source electrode of the transistor T10 is "H", which is a potential of the signal VTP. Therefore, in the second embodiment, almost no current flows between the source electrode and the drain electrode of the transistor T10, so that a decrease in the potential of the node N1 can be prevented even when the initialization circuit 268 is included in the unit circuit 201*a*. Note that other configurations and effects according to the second embodiment are similar to the configurations and effects according to the first embodiment.

Third Embodiment

Next, a configuration of a display device 300 according to a third embodiment will be described with reference to FIGS. 13 to 16. In the third embodiment, a terminal R of a unit circuit 301*a* receives a clock signal supplied to other unit circuits 301*a*. Note that the same configurations as those of the first embodiment will be denoted by the same reference signs as those of the first embodiment, and descriptions thereof will be omitted.

Figure 13:
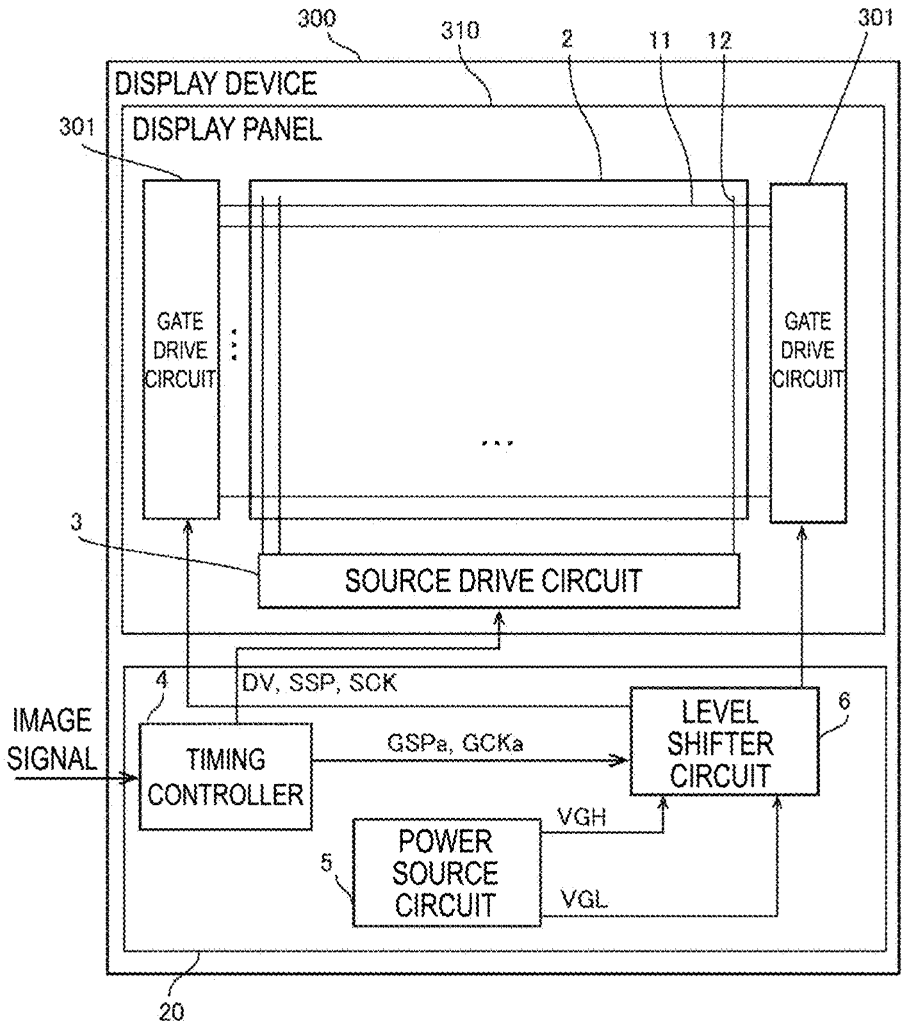
FIG. 13 is a block diagram of a display device 300 according to a third embodiment.
Figure 14:
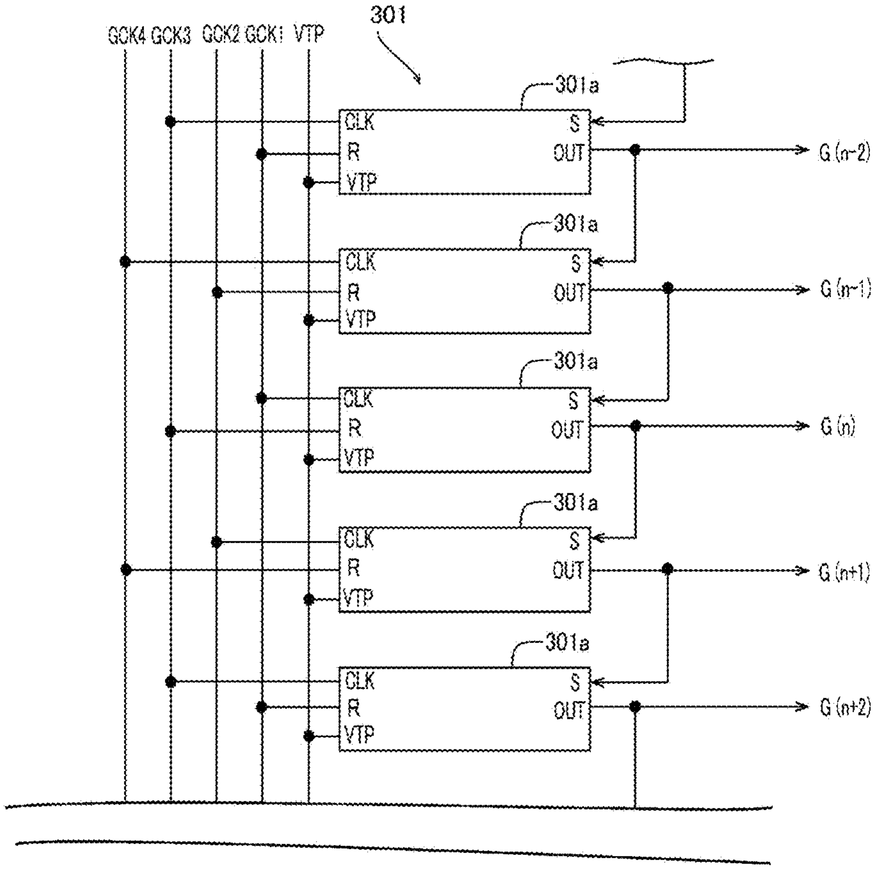
FIG. 14 is a diagram for describing a configuration of a gate drive circuit 301 according to the third embodiment.
Figure 15:
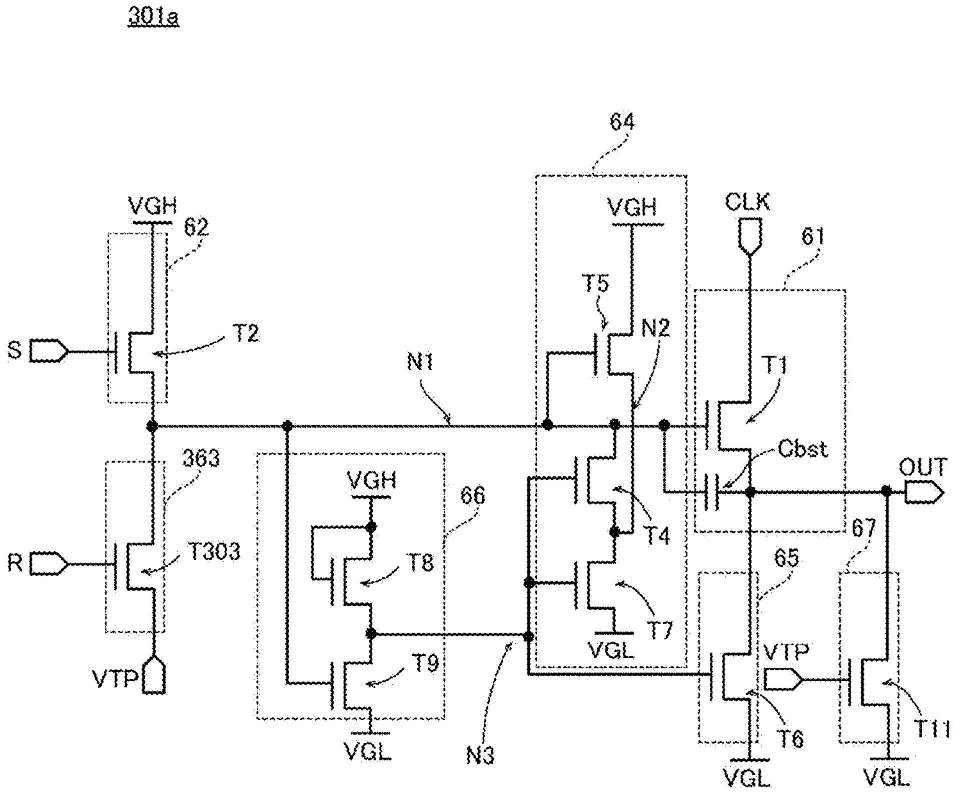
FIG. 15 is a circuit diagram for describing a configuration of a unit circuit 301*a* according to the third embodiment.
Figure 16:
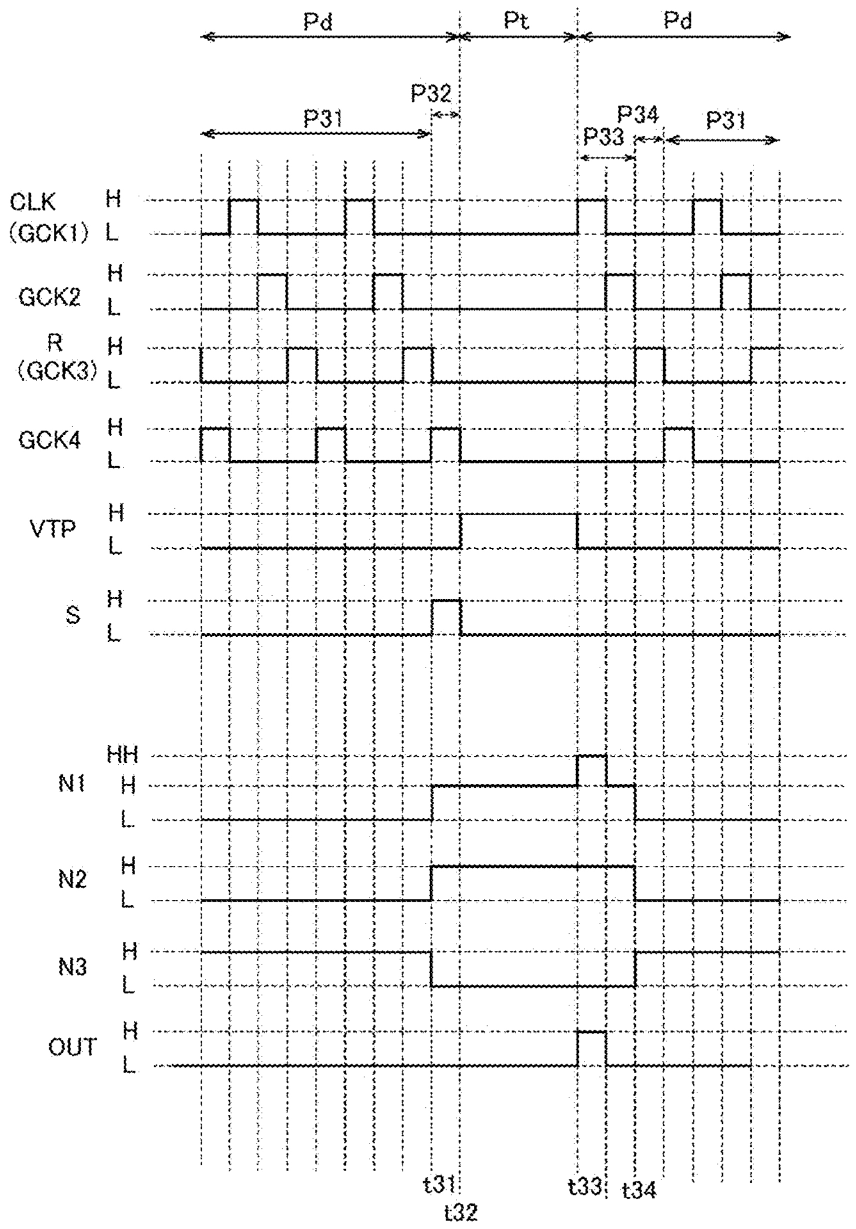
FIG. 16 is a timing chart for describing signals input to corresponding terminals of the unit circuit 301*a* according to the third embodiment.

FIG. 13 is a block diagram of the display device 300 according to the third embodiment. FIG. 14 is a diagram describing a configuration of a gate drive circuit 301 according to the third embodiment. FIG. 15 is a circuit diagram describing a configuration of the unit circuit 301*a* according to the third embodiment. FIG. 16 is a timing chart for describing signals input to corresponding terminals of the unit circuit 301*a* according to the third embodiment.

As illustrated in FIG. 13, the display device 300 includes a display panel 310 provided with the gate drive circuits 301. As illustrated in FIG. 14, the terminal R of each unit circuit 301*a* of the gate drive circuit 301 receives the clock signal input to terminals CLK of other unit circuits 301*a*. For example, a clock signal GCK1 is input to a terminal CLK of the nth stage unit circuit 301*a*, and a clock signal GCK3 is input to the terminal R of the nth stage unit circuit 301*a*. The clock signal GCK3 is a clock signal input to the terminals CLK of the (n−2)th stage unit circuit 301*a* and the (n+2)th stage unit circuit 301*a*. Unlike the first embodiment, a drive signal output from a terminal OUT is not input to the terminal R.

As illustrated in FIG. 15, the unit circuit 301*a* includes a circuit 363. The circuit 363 includes a transistor T303. Assuming that the unit circuit 301*a* illustrated in FIG. 15 is the nth unit circuit, a gate electrode of the transistor T303 receives the clock signal GCK3 input to the terminals CLK of the (n−2)th unit circuit 301*a* and the (n+2)th unit circuit 301*a*.

As illustrated in FIG. 16, during a period P31, the unit circuits 301*a* up to the previous stage are driven, and the clock signal GCK3 is input to the terminals R. At a time t31 when a period P32 starts, when a set signal is input to the terminal S (when a voltage becomes "H"), nodes N1 and N2 are charged from "L" to "H" and a node N3 is discharged from "H" to "L". Then, at a time t32 when a display period Pd (period P32) ends and a touch detection period Pt starts, a VTP signal becomes "H" and supply of the clock signals GCK1 to GCK4 to the unit circuits 301*a* is stopped, thereby stopping scanning by the gate drive circuit 301.

At a time t33 when the touch detection period Pt ends and the display period Pd (period P33) starts, the clock signal GCK1 is input to the terminal CLK. As a result, the potential of the node N1 rises from "H" to "HH". Then, the potential of the terminal OUT becomes "H", a gate signal is output, and a set signal is input to the unit circuit 301*a* in the next stage. At a time t34 when the period P33 ends and a period P34 starts, when the clock signal GCK3 is input to the terminal R (when the voltage becomes "H"), the node N1 is discharged from "HH" to "L", the node N2 is discharged from "H" to "L", and the node N3 is charged from "L" to "H". Thus, in the third embodiment, the clock signal can be used as a reset signal. Note that other configurations and effects of the third embodiment are similar to the configurations and effects of the first embodiment.

Modified Examples

Although embodiments of the disclosure have been described above, the embodiments described above are merely examples for implementing the disclosure. Thus, the disclosure is not limited to the embodiments described above and can be implemented by appropriately modifying the embodiments described above within a range that does not depart from the gist of the disclosure. Now, modified examples of the above-described embodiments will be described.

(1) In the first to third embodiments, an example in which the display device is configured as a liquid crystal display device is illustrated, but the disclosure is not limited to this example. For example, the display device may be configured as an organic EL display device, a micro LED display device, or the like.

(2) In the first to third embodiments, the connection relationship between the transistor and the nodes is described by specifying the source electrode and the drain electrode, but the disclosure is not limited thereto. That is, in the first to third embodiments, the source electrode and the drain electrode may be interchanged.

(3) In the first to third embodiments, an example in which the display device has a touch detection function is illustrated, but the disclosure is not limited to this example. That is, the technique of the disclosure may be applied to a display device that does not have a touch detection function.

(4) In the first to third embodiments, an example in which the clock signal is provided in four phases of GCK1 to GCK4 is illustrated, but the disclosure is not limited to this example. The clock signal may be provided in a single phase, two phases, or three phases, or five or more phases.

(5) In the first to third embodiments, an example in which the transistor includes a crystalline In—Ga—Zn—O-based oxide semiconductor is illustrated, but the disclosure is not limited to this example. The transistor may include an amorphous In—Ga—Zn—O-based oxide semiconductor, may include an oxide semiconductor other than In—Ga—Zn—O-based, or may include silicon.

(6) In the first to third embodiments, an example in which the capacitor Cbst is included in the unit circuit is illustrated, but the disclosure is not limited to this example. In a case in which the bootstrap operation can be performed by the capacitance of the transistor T1, the bootstrap capacitor is not necessarily provided in the unit circuit.

(8) In the first to third embodiments, an example in which the unit circuit outputs the drive signal to one gate line is illustrated, but the disclosure is not limited to this example. For example, the unit circuit may output the drive signal to multiple gate lines.

Figure 17:
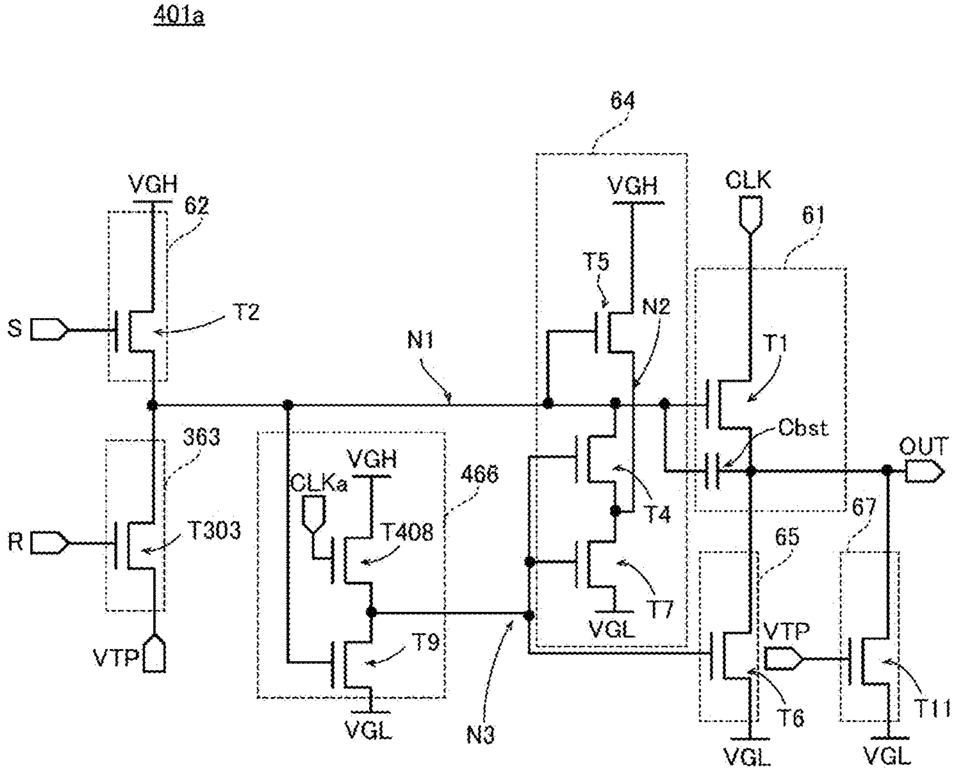
FIG. 17 is a circuit diagram for describing a configuration of a unit circuit 401*a* according to a modified example of the first to third embodiments.

(9) In the third embodiment, an example of connecting the terminal to which the gate-on voltage is applied to the gate electrode of the transistor T8, but the disclosure is not limited to this example. For example, as in a unit circuit 401*a* according to a modified example illustrated in FIG. 17, a clock signal supplied to a transistor T303 as a reset signal (e.g., a clock signal supplied to the unit circuit two stages latter) may be supplied to a transistor T408 in a circuit 466. A gate electrode of the transistor T408 in the nth stage unit circuit 401*a* is connected to a terminal CLKa, and a clock signal GCK3 supplied to the (n+2)th stage unit circuit 401*a* is input to the terminal CLKa. This also provides an effect similar to the effect of the third embodiment.

The above-described configuration can also be described as follows.

A drive circuit according to a first configuration is a drive circuit that includes multiple unit circuits, each of the multiple unit circuits outputs a drive signal to at least one scanning signal line of a group of scanning signal lines. A drive period during which the drive signal is supplied to the group of scanning signal lines in response to input of a clock signal and a stop period during which supply of the drive signal to the group of scanning signal lines is stopped are provided within one cycle of a vertical synchronization signal. A unit circuit of the multiple unit circuits includes a first node, a first transistor configured to output the drive signal to the scanning signal line, the first node being connected to a gate electrode of the first transistor, the clock signal being applied to one of a source electrode and a drain electrode of the first transistor, and the other of the source electrode and the drain electrode of the first transistor being connected to the scanning signal line, a second transistor to which a set signal for the unit circuit is input, the set signal being input to a gate electrode of the second transistor, and one of a source electrode and a drain electrode of the second transistor being connected to the first node, a third transistor to which a reset signal for the unit circuit is input, the reset signal being input to a gate electrode of the third transistor, and one of a source electrode and a drain electrode of the third transistor being connected to the first node, a second node, a fourth transistor, the first node being connected to one of a source electrode and a drain electrode of the fourth transistor, and the second node being connected to the other of the source electrode and the drain electrode of the fourth transistor, and a fifth transistor, the first node being connected to a gate electrode of the fifth transistor, a gate-on voltage being applied to one of a source electrode and a drain electrode of the fifth transistor, and the second node being connected to the other of the source electrode and the drain electrode of the fifth transistor, and a stop period signal configured to be the gate-on voltage during the stop period and configured to be a gate-off voltage during the drive period is input to the other of the source electrode and the drain electrode of the third transistor (first configuration).

According to the first configuration described above, during the stop period, a potential difference between the drain electrode of the third transistor and the source electrode of the third transistor is a difference between a potential of the first node and the gate-on voltage (almost 0). Thus, a current (leakage current) flowing between the drain electrode of the third transistor and the source electrode of the third transistor can be reduced, thereby suppressing a decrease in the potential of the first node. Further, during the stop period, a potential difference between the drain electrode of the fourth transistor and the source electrode of the fourth transistor is a difference between the potential of the first node and the gate-on voltage. Thus, almost no current flows between the drain electrode of the fourth transistor and the source electrode of the fourth transistor, thereby preventing a decrease in the potential of the first node. As a result, the potential of the first node can be maintained even during the stop period, eliminating the need for a charging circuit to recharge the first node before the drive period starts, thereby downsizing the unit circuit.

In the first configuration, the unit circuit may further include a third node, a sixth transistor, a seventh transistor, an eighth transistor, and a ninth transistor. The third node may be connected to a gate electrode of the sixth transistor, the gate-off voltage may be applied to one of a source electrode and a drain electrode of the sixth transistor, and the scanning signal line may be connected to the other of the source electrode and the drain electrode of the sixth transistor. The third node may be connected to a gate electrode of the seventh transistor, the gate-off voltage may be applied to one of a source electrode and a drain electrode of the seventh transistor, and the second node may be connected to the other of the source electrode and the drain electrode of the seventh transistor. The gate-on voltage may be applied to one of a source electrode and a drain electrode of the eighth transistor, and the third node may be connected to the other of the source electrode and the drain electrode of the eighth transistor. The first node may be connected to a gate electrode of the ninth transistor, the gate-off voltage may be applied to one of a source electrode and a drain electrode of the ninth transistor, and the third node may be connected to the other of the source electrode and the drain electrode of the ninth transistor. The third node may be connected to a gate electrode of the fourth transistor (second configuration).

According to the second configuration, the ninth transistor is on an off state when the potential of the first node is low (not charged), and the third node is charged via the eighth transistor. This causes the fourth transistor, the sixth transistor, and the seventh transistor to be in an on state. With the fourth transistor and the seventh transistor in the on state, the second node can be discharged. When the sixth transistor is in the on state, a potential of the scanning signal line can be lowered to the gate-off voltage. The ninth transistor is in the on state when the potential of the first node is high (charged), and a potential of the third node is lowered to the gate-off voltage. This causes the fourth transistor, the sixth transistor, and the seventh transistor to be in the off state. The fourth transistor and the seventh transistor are in the off state, and the second node is charged via the fifth transistor. When the sixth transistor is in the off state, a drive signal can be output to the scanning signal line. That is, the third node for controlling the sixth transistor can be used as a node for controlling the fourth transistor and the seventh transistor.

In the first or second configuration, the unit circuit may further include a 10th transistor. An initialization signal may be input to a gate electrode of the 10th transistor, the initialization signal being configured to be the gate-on voltage immediately after a start of input of a power supply voltage to the drive circuit, immediately before a stop of input of the power supply voltage to the drive circuit, or in synchronization with a vertical synchronization signal, and being configured to be the gate-off voltage during the drive period and the stop period. One of a source electrode and a drain electrode of the 10th transistor may be connected to the first node. The stop period signal may be input to the other of the source electrode and the drain electrode of the 10th transistor (third configuration).

According to the third configuration, during the stop period, a potential difference between the drain electrode of the 10th transistor and the source electrode of the 10th transistor is a difference between the potential of the first node and the gate-on voltage (almost 0). Thus, a current (leakage current) flowing between the drain electrode of the 10th transistor and the source electrode of the 10th transistor can be reduced. As a result, even when the 10th transistor for initialization is included in the unit circuit, a decrease in the potential of the first node can be prevented.

In any one of the first to third configurations, a clock signal input to another unit circuit different from the unit circuit itself may be input to the gate electrode of the third transistor as the reset signal (fourth configuration).

According to the fourth configuration, the clock signal input to another unit circuit different from the unit circuit itself can be used as the reset signal.

A display device according to a fifth configuration includes the drive circuit according to any one of the first to fourth configurations and a substrate provided with the group of scanning signal lines (fifth configuration).

According to the fifth configuration, the potential of the first node can be maintained even during the stop period, so that a charging circuit for recharging the first node before the drive period starts is not necessary. As a result, a display device that allows the unit circuit to be downsized can be provided.

A display device having a touch detection function according to a sixth configuration includes the drive circuit according to any one of the first to fourth configurations and a touch panel provided with the group of scanning signal lines, being configured to display an image during the drive period, and being configured to detect a touch by a pointer during the stop period (sixth configuration).

According to the sixth configuration, the potential of the first node can be maintained even during the stop period, so that a charging circuit for recharging the first node before the drive period starts is not necessary. As a result, a display device having a touch detection function that allows the unit circuit to be downsized can be provided.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A drive circuit comprising:

a plurality of unit circuits, each of the plurality of unit circuits being configured to output a drive signal to at least a scanning signal line of a group of scanning signal lines, wherein a drive period, during which the drive signal is supplied to the group of scanning signal lines in response to inputting a clock signal, and a stop period, during which supply of the drive signal to the group of scanning signal lines is stopped, are provided within one cycle of a vertical synchronization signal, a unit circuit of the plurality of unit circuits includes:

a first node, a first transistor configured to output the drive signal to the scanning signal line, the first node being connected to a gate electrode of the first transistor, the clock signal being applied to one of a source electrode and a drain electrode of the first transistor, and the other of the source electrode and the drain electrode of the first transistor being connected to the scanning signal line, a second transistor to which a set signal for the unit circuit is input, the set signal being input to a gate electrode of the second transistor, and one of a source electrode and a drain electrode of the second transistor being connected to the first node, a third transistor to which a reset signal for the unit circuit is input, the reset signal being input to a gate electrode of the third transistor, and one of a source electrode and a drain electrode of the third transistor being connected to the first node, a second node, a fourth transistor, the first node being further connected to one of a source electrode and a drain electrode of the fourth transistor, and the second node being connected to the other of the source electrode and the drain electrode of the fourth transistor, and a fifth transistor, the first node being connected to a gate electrode of the fifth transistor, a gate-on voltage being applied to one of a source electrode and a drain electrode of the fifth transistor, and the second node being further connected to the other of the source electrode and the drain electrode of the fifth transistor, and a stop period signal, configured to be the gate-on voltage during the stop period, and configured to be a gate-off voltage during the drive period, is input to the other of the source electrode and the drain electrode of the third transistor, wherein, during the stop period, the stop period signal of a high-level voltage is supplied to the first node through the one of the source electrode and the drain electrode of the third transistor.

2. A drive circuit comprising:

a plurality of unit circuits, each of the plurality of unit circuits being configured to output a drive signal to at least a scanning signal line of a group of scanning signal lines, wherein a drive period, during which the drive signal is supplied to the group of scanning signal lines in response to inputting a clock signal, and a stop period, during which supply of the drive signal to the group of scanning signal lines is stopped, are provided within one cycle of a vertical synchronization signal, a unit circuit of the plurality of unit circuits includes:

a first node, a first transistor configured to output the drive signal to the scanning signal line, the first node being connected to a gate electrode of the first transistor, the clock signal being applied to one of a source electrode and a drain electrode of the first transistor, and the other of the source electrode and the drain electrode of the first transistor being connected to the scanning signal line, a second transistor to which a set signal for the unit circuit is input, the set signal being input to a gate electrode of the second transistor, and one of a source electrode and a drain electrode of the second transistor being connected to the first node, a third transistor to which a reset signal for the unit circuit is input, the reset signal being input to a gate electrode of the third transistor, and one of a source electrode and a drain electrode of the third transistor being connected to the first node, a second node, a fourth transistor, the first node being further connected to one of a source electrode and a drain electrode of the fourth transistor, and the second node being connected to the other of the source electrode and the drain electrode of the fourth transistor, and a fifth transistor, the first node being connected to a gate electrode of the fifth transistor, a gate-on voltage being applied to one of a source electrode and a drain electrode of the fifth transistor, and the second node being further connected to the other of the source electrode and the drain electrode of the fifth transistor, and a stop period signal, configured to be the gate-on voltage during the stop period, and configured to be a gate-off voltage during the drive period, is input to the other of the source electrode and the drain electrode of the third transistor, wherein the unit circuit further includes a third node, a sixth transistor, a seventh transistor, an eighth transistor, and a ninth transistor, the third node is connected to a gate electrode of the sixth transistor, the gate-off voltage is applied to one of a source electrode and a drain electrode of the sixth transistor, and the scanning signal line is connected to the other of the source electrode and the drain electrode of the sixth transistor, the third node is further connected to a gate electrode of the seventh transistor, the gate-off voltage is further applied to one of a source electrode and a drain electrode of the seventh transistor, and the second node is further connected to the other of the source electrode and the drain electrode of the seventh transistor, the gate-on voltage is further applied to one of a source electrode and a drain electrode of the eighth transistor, and the third node is further connected to the other of the source electrode and the drain electrode of the eighth transistor, the first node is further connected to a gate electrode of the ninth transistor, the gate-off voltage is further applied to one of a source electrode and a drain electrode of the ninth transistor, and the third node is further connected to the other of the source electrode and the drain electrode of the ninth transistor, and the third node is further connected to a gate electrode of the fourth transistor.

3. The drive circuit according to claim 1, wherein:

the unit circuit further includes a 10th transistor, an initialization signal is input to a gate electrode of the 10th transistor, the initialization signal being configured to be the gate-on voltage either immediately after a start of an input of a power supply voltage to the drive circuit, or immediately before stopping the input of the power supply voltage to the drive circuit, or in synchronization with the vertical synchronization signal, or the initialization signal being configured to be the gate-off voltage during the drive period and the stop period, one of a source electrode and a drain electrode of the 10th transistor is connected to the first node, and the stop period signal is further input to the other of the source electrode and the drain electrode of the 10th transistor.

4. The drive circuit according to claim 1, wherein the clock signal input to another unit circuit, different from the unit circuit, is further input to the gate electrode of the third transistor as the reset signal.

5. A display device comprising:

the drive circuit according to claim 1; and a substrate provided with the group of scanning signal lines.

6. A display device having a touch detection function, the display device comprising:

the drive circuit according to claim 1; and a touch panel provided with the group of scanning signal lines, being configured to display an image during the drive period, and being configured to detect a touch by a pointer during the stop period.

* * * * *